(12) United States Patent
Summerfield

(10) Patent No.: US 12,321,432 B2
(45) Date of Patent: Jun. 3, 2025

(54) COMPUTER IMPLEMENTED METHOD

(71) Applicant: FARX TECHNOLOGIES LIMITED, Malvern (GB)

(72) Inventor: Clive David Summerfield, Ledbury (GB)

(73) Assignee: FARX TECHNOLOGIES LIMITED, Malvern (GB)

( * ) Notice: Subject to any disclaimer, the term of this patent is extended or adjusted under 35 U.S.C. 154(b) by 189 days.

(21) Appl. No.: 18/026,075

(22) PCT Filed: Sep. 14, 2021

(86) PCT No.: PCT/GB2021/052378
§ 371 (c)(1),
(2) Date: Mar. 13, 2023

(87) PCT Pub. No.: WO2022/053834
PCT Pub. Date: Mar. 17, 2022

(65) Prior Publication Data
US 2023/0359719 A1    Nov. 9, 2023

(30) Foreign Application Priority Data
Sep. 14, 2020   (GB) ...................................... 2014436

(51) Int. Cl.
*G06F 21/32*    (2013.01)
*G06V 40/16*    (2022.01)
*G06V 40/70*    (2022.01)
*G10L 17/02*    (2013.01)
*G10L 17/10*    (2013.01)

(52) U.S. Cl.
CPC ............ *G06F 21/32* (2013.01); *G06V 40/171* (2022.01); *G06V 40/172* (2022.01); *G06V 40/70* (2022.01); *G10L 17/02* (2013.01); *G10L 17/10* (2013.01)

(58) Field of Classification Search
None
See application file for complete search history.

(56) References Cited

U.S. PATENT DOCUMENTS

| | | |
|---|---|---|
| 9,430,629 B1 | 8/2016 | Ziraknejad et al. |
| 2009/0116703 A1 | 5/2009 | Schultz |
| (Continued) | | |

*Primary Examiner* — Cai Y Chen
(74) *Attorney, Agent, or Firm* — Quarles & Brady LLP

(57) ABSTRACT

A computer-implemented method of authenticating an identity of a specific user is disclosed. The method comprises the steps of acquiring a first data set representative of a voice of a user over a time interval between a first and second time, and providing the first data set as input to a computing device. The method further comprises acquiring a second data set representative of a visual appearance of at least a portion of the user over the time interval between the first and second time, and providing the second data set as input to the computing device. The method further comprises maintaining a temporal synchronous of the first and second data sets over the time interval comparing the first and second data sets with predetermined data sets relating to the voice and visual appearance of at least a portion of the specific user, generating a confidence level in dependence of a relative correspondence of the first and second data sets with the predetermined data sets and authenticating the user as the specific user where the confidence level is above a predetermined value.

15 Claims, 3 Drawing Sheets

(56) References Cited

U.S. PATENT DOCUMENTS

| | | |
|---|---|---|
| 2013/0267204 A1 | 10/2013 | Schultz et al. |
| 2014/0333414 A1 | 11/2014 | Kursun et al. |
| 2014/0333415 A1 | 11/2014 | Kursun et al. |
| 2017/0308739 A1* | 10/2017 | Wang .................. G10L 15/25 |
| 2019/0222424 A1* | 7/2019 | Lindemann ........... H04L 9/3297 |

\* cited by examiner

COMPUTER IMPLEMENTED METHOD

This application represents the U.S. national stage entry of International Application No. PCT/GB2021/052378 filed Sep. 14, 2021, which claims priority to Great Britain Patent Application No. 2014436.6 filed Sep. 14, 2020, the disclosure of which is incorporated herein by reference in its entirety and for all purposes.

The present invention relates to a computer implemented method of authenticating an identity of a user.

Traditionally, access to secure online services, such as banking, financial services, online shopping, social media, email, and online conferencing services are made secure by using personal identification numbers (PINs) and passwords. Often these are stored in the web browser, thus allowing anyone with access to the computer, be it a PC, laptop, tablet or a smartphone, access to secure websites. Whilst storing PINs and passwords in the browser may be very convenient for the user, it is highly insecure.

New multi-factor security regulations are also being introduced, such as "Payment Systems Directive 2" (PSD2), to combat the increasing levels of online identity theft and fraud, and the spiralling financial losses to online businesses from stolen PINs, passwords and other security credentials, such as stolen personal information (such as names, addresses, dates of birth and so on).

These new regulations require online transactions, for example, to have the same level of multi-factor identity authentication as transactions that take place in physical locations, such as in shops where a customer must present a credit card (something they have) and enter a PIN for that credit card (something they know) to complete the transaction.

The traditional method for delivering multi-factor authentication for online transactions is to send a one-time PIN or password to a mobile phone via a "short message service" (SMS) message or to an email address, or to issue special hardware, such as hardware tokens (RSA tokens) and card readers, to individuals. These solutions, whilst widely used, have several problems including being insecure (if someone has access to your mobile phone they will have access to your SMS messages and most probably your emails), expensive to deliver (especially solutions using hardware tokens) and cumbersome and inconvenient to use. What is more, the fact that you have multiple factors providing higher levels of security and identity assurance; is no proof that you are the authorised user or that you are actually a live person instead of a bot accessing a service.

We have now developed a method which addresses at least some of the above-mentioned problems.

According to a first aspect of the present invention, there is provided a computer implemented method of authenticating an identity of a user, the method comprising the steps: acquiring a first data set representative of a voice of a user over a time interval between a first and second time and providing the first data set as input to a computing device; acquiring a second data set representative of a visual appearance of at least a portion of the user over the time interval between the first and second time and providing the second data set as input to the computing device; maintaining a temporal synchronous of the first and second data sets over the time interval; comparing the first and second data sets with predetermined data sets relating to the voice and visual appearance of at least a portion of the specific user; generating a confidence level in dependence of a relative correspondence of the first and second data sets with the predetermined data sets; and authenticating the user as the specific user where the confidence level is above a predetermined value.

The invention describes a software technology that allows a website to switch on a microphone and camera on a computer or smartphone of a user accessing that website, and then accesses a secure service which utilises fused voice and face biometric technologies, implemented as a Cloud service, to verify the identity of the user, and to inform the website of the authentication result. Advantageously, the method is frictionless and transparently integrated so the user experience will be largely unchanged, making it highly convenient to use. Further, as the method is delivered through a web browser, there is no need to send a one-time PIN or password via SMS messaging or email, or for that matter to use expensive hardware tokens or card readers. In addition, as this is a biometric technology, it can also be used to detect, track and biometrically identify fraudsters attempting to access secure services, making it a technology that most online fraudsters would not attempt to encounter.

In an embodiment, the method of authenticating is performed over a temporal session period. Additionally, the steps of the method are repeated during the temporal session period.

In an embodiment, the first data set representative of the voice of the user is processed to extract acoustic parameters pertinent for both voice biometric and speech recognition analysis. Acoustic parameters may include but are not limited to Mel Frequency Cepstrum Coefficient (MFCC) parameters. These parameters are typically computed many times per second (typically 100 times per second), along with the first and second derivatives of the parameters.

In an embodiment, the second data set representative of the visual appearance of at least a portion of the user, is processed to extract user visual feature parameters pertinent for face recognition analysis. Typical visual feature parameters, such as face parameters, may be obtained via a wavelet analysis, such as a Haar wavelet analysis, to extract Haar-like features. A Haar-wavelet is a sequence of rescaled square-shaped functions that are used to detect edges and lines in the image and is well known in field of face recognition.

In an embodiment, the visual feature parameters, such as a the Haar-like feature parameters are extracted typically 100 times per second and in a preferred embodiment, the acoustic parameters, such as a the MFCC parameters and the visual feature parameters, such as the Haar-like feature parameters are extracted synchronously, so that each acoustic parameter can be associated with the time equivalent visual feature parameter.

In an embodiment, face and voice biometric technologies and speech recognition technologies are utilised and fused at the voice acoustic and face parameter level. This allows the voice and face biometric and recognition analysis to be synchronised enabling acoustic and speech recognition attributes to be synchronised with visual face gestures, and vice versa. Fusion at the parametric level allows, for example, lip movement to be associated with specific voice sounds. This provides a liveness function, that ensures that the voice being biometrically analysed is being generated from the face under analysis. Where multiple faces are present, it can validate whether the voice processed is generated by the face under analysis. The fusion of voice and face biometrics at the parameter level also allows face gestures and expressions to be associated with specific voice acoustic attributes. These, for example, may include detecting emotional attributes such as anger, frustration and delight from the combination of voice acoustic analysis and facial feature expressions.

In a further embodiment, lip detection is used to synchronise lip movement with phonetic speech recognition results, to determine if the lip movement is consistent with phonetic sounds recognised by the voice biometric and speech recognition analysis. Where lip movement is not detected, the phonetic result and associated voice biometric result may be discarded, as it can be determined that the phonetic sounds recognised by the speech recognition analysis were not generated by the speaker (namely, the user) recognised in the image. The phonetic sound could come from external sources, such as other people speaking in the background, background radios, televisions, public address systems, or external noises and interference and ambient noises or sounds however produced. The method allows spurious recognition and voice biometric results to be ignored and excluded from the recognition result. This provided additional robustness of the speech recognition and voice biometric results in high noise environment.

Further, the fusion of voice and face biometrics at the parameter level that allows face gestures and expressions to be associated with specific voice acoustic attributes, provides a level of confidence that the first and second data sets used by the system are generated by a live person. This can be used to identify malicious and fraudulent attempts to simulate an identify of an individual where separate still images and voice recordings are presented to the computing device, using an automated bot for example.

In an embodiment, when the first and second data sets generate a confidence level above the predetermined value, the first and second data sets are appended to the predetermined data sets. Additionally, the method of authenticating is terminated and/or restarted when the generated confidence level is below the predetermined value. Additionally, the first and second data sets which generate a confidence level below the predetermined value are captured separately to the predetermined data sets. Further, the confidence level may comprise a voice confidence level and a visual confidence level.

In an embodiment, the method further comprises the step of comparing the first data set with the second data set over the temporal interval to determine correspondence between the data sets, for determining whether the first and second data source come from the same user, for example.

In an embodiment, the method further comprises the step of providing instructions to the user relating to the first data set and second data set. It is envisaged that this feature facilitates the use of different authentication means, such as voice commands or visual cues during different sessions.

In an embodiment, the method further comprises the step of providing one or more further biometric data sets of a user, as input to the computing device, and generating a confidence level in dependence of a relative correspondence of the further data sets with the predetermined data sets.

In an embodiment, the method steps are implemented in HTML5.

In a separate aspect there is provides an electronic commerce transaction process or telecommunication access process for accessing a telecommunications system comprising the steps of the method of authenticating an identity of a specific user.

The invention may be produced in various ways and an embodiment thereof will now be described, by way of example only, reference being made to the accompanying drawings, in which:—

Figure 1:
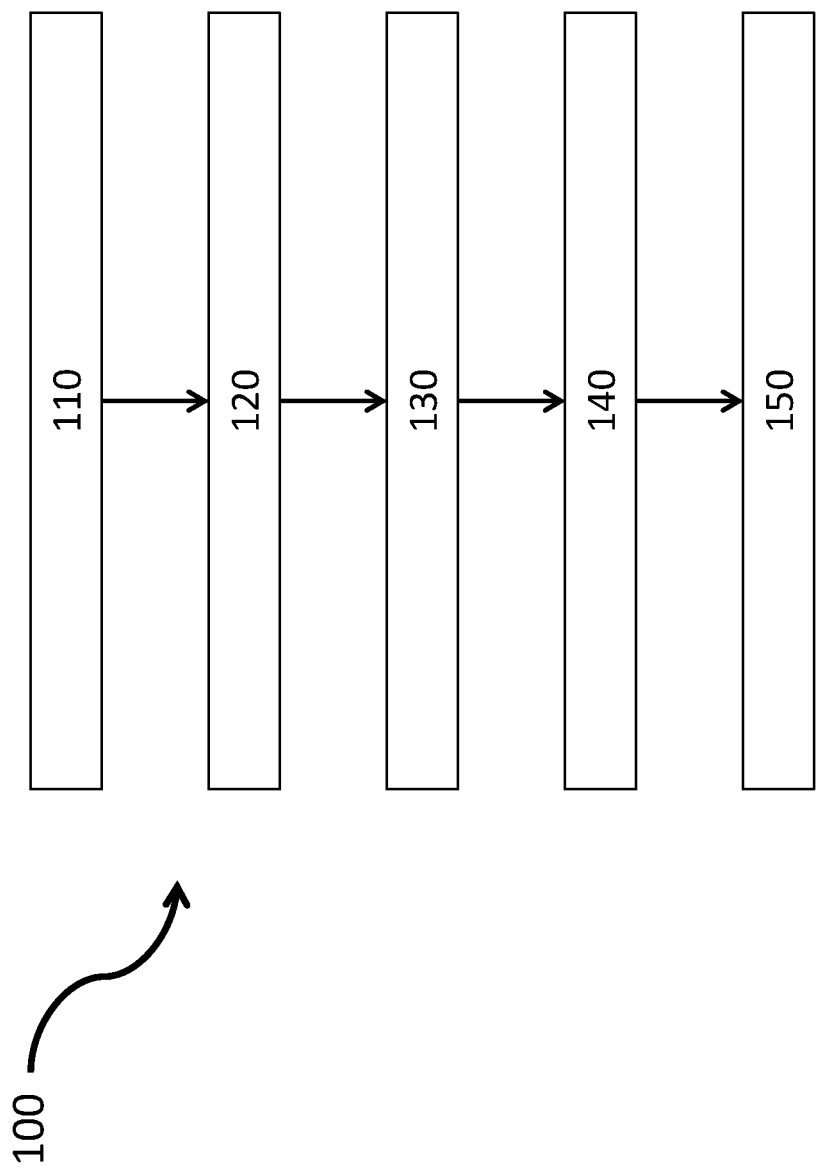
FIG. 1 is a flow diagram showing an embodiment of the method according to the present invention.

Referring to FIG. 1 of the drawings, there is illustrated a flow chart sequencing the steps of a method (100) according to an embodiment of the present invention, for authenticating an identity of a specific user. The method comprises the steps of: acquiring a first data set representative of a voice of a user and providing the first data set as input to a computing device (110); acquiring a second data set representative of a visual appearance of at least a portion of the user and providing the second date set as input to the computing device (120); comparing the first and second data sets with predetermined data sets relating to the voice and visual appearance of at least a portion of the specific user (130); generating a confidence level in dependence of a relative correspondence of the first and second data sets with the predetermined data sets (140); and authenticating the user as the specific user where the confidence level is above a predetermined value (150). Once these steps are completed the identity of a specified user can be authenticated.

The method can be modified such that the steps of the method are performed over a temporal session period, whereby the method is completed within the time period for determining an authentication, as will be required by many embodiments, for reasons of security. Additionally, the steps of the method are repeated during the temporal session period, whereby the method becomes a continuous method of authentication throughout the time period as may be required by select embodiments.

In specific embodiments of the method, where the first and second data sets generate a confidence level above the predetermined value, the first and second data sets are appended to the predetermined data sets. This allows for the predetermined data sets to be updated to improve the performance of the authentication method. In another embodiment, the method of authenticating is terminated and/or restarted when the generated confidence level is below the predetermined value; ending the authentication method prevents unauthorised access by non-specified users. In a further embodiment, where the first and second data sets which generate a confidence level below the predetermined value are captured separately to the predetermined data sets, this allows for the creation of a data set of known unauthorised users, which may be used to improve the performance of the authentication method. The confidence level may be derived from separate voice confidence level and visual confidence level in dependence on the relative correspondence of the first data set with the predetermined data and the second data set with the predetermined data.

Figure 2:
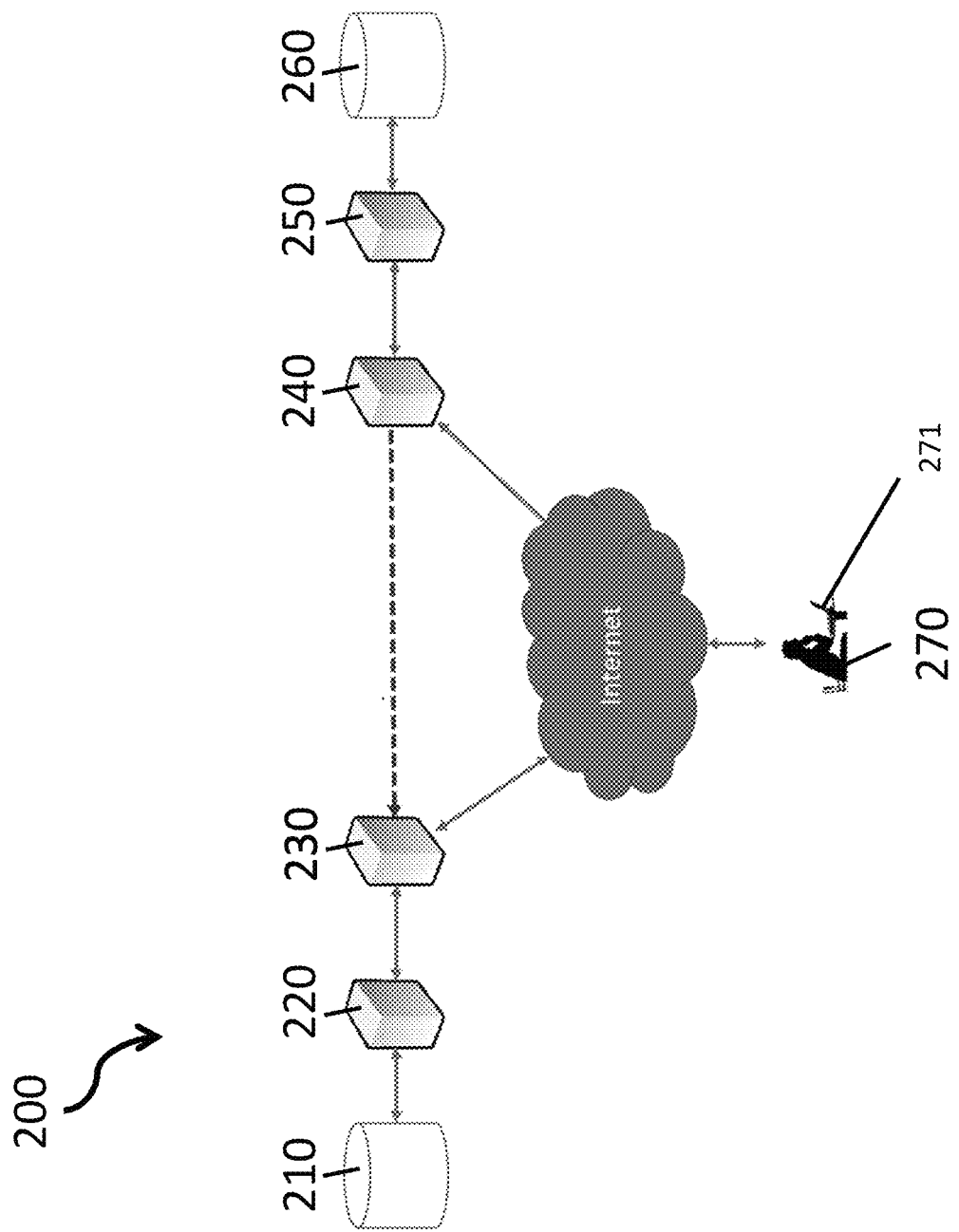
FIG. 2 is a schematic illustration of a system for implementing a method according to an embodiment of the present invention, for use in authenticating a user identify during an internet transaction; and, FIG. 3 is a schematic illustration of the components of the authentication server of the system illustrated in FIG. 2.

FIG. 2 illustrates a system (200) configured to perform the method according to an embodiment of the present invention. The system comprises: a service provider website (230), an application server (220) and associated database (210) for hosting the code to launch an embodiment of the method invention. A proxy server (240) is also provided for forwarding requests and data captured from the users computing device (271), to an authentication server (250) and associated authentication database (260) storing the predetermined data sets.

Figure 3:
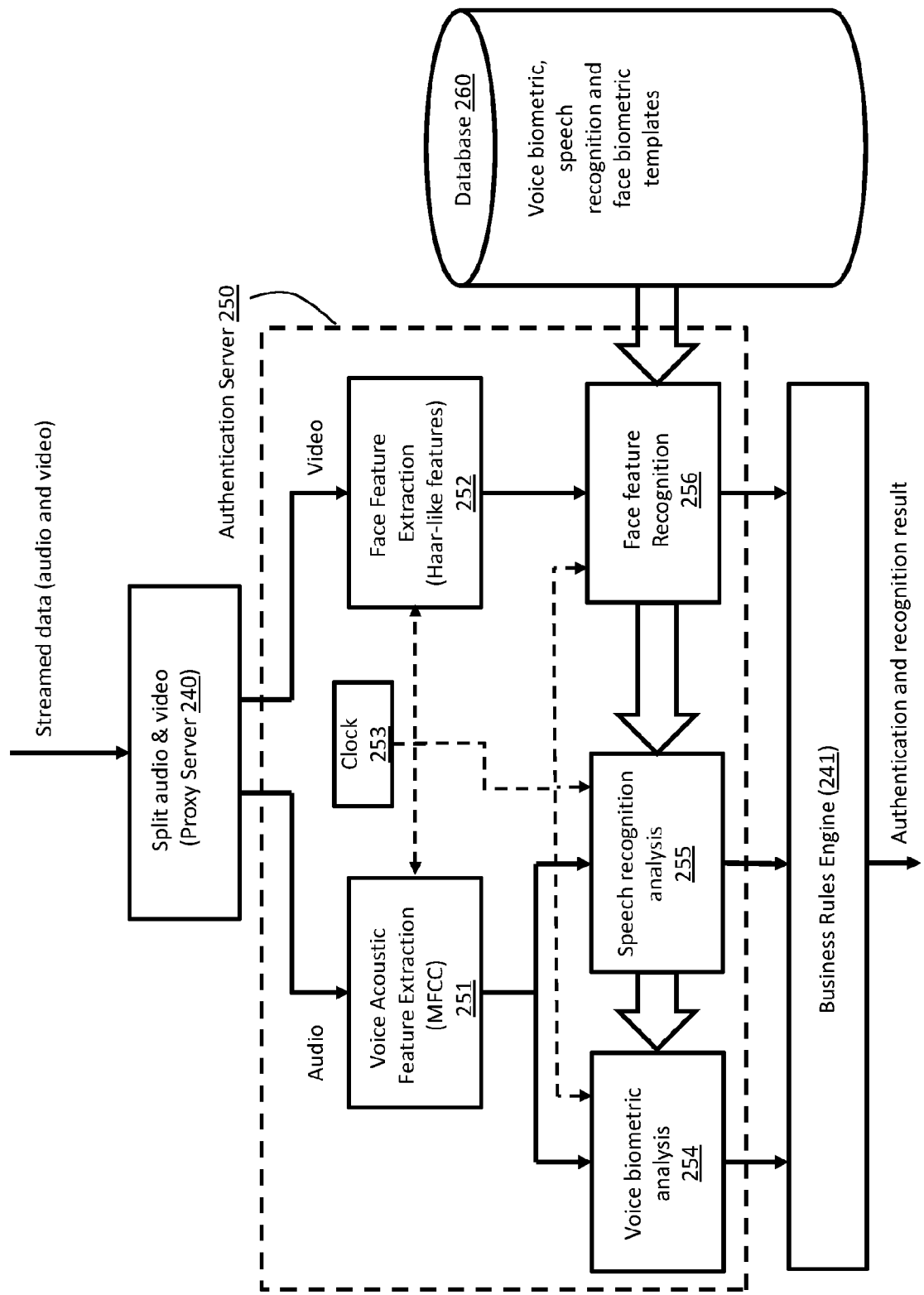

Referring to FIG. 3 of the drawings, there is illustrated a schematic illustration of the components of the authentication server (250). The first and second data sets (representative of voice and visual appearance (such as the face) of the user) are acquired from the user's computing device (271) via a camera and microphone (not shown) for example, and the data sets (audio and video) are streamed to the proxy server (240) where the data sets are split into the audio and video streams. The audio stream is passed to a voice acoustic feature extraction technology (251) of the server (250) to extract the acoustic parameters pertinent for voice biometric analysis and speech recognition analysis. In an embodiment, this could be a Mel Frequency Cepstrum Coefficient (MFCC) analysis well known in the art of voice biometric and speech recognition. The video stream is passed to a face parameter extraction algorithm to detect parameters pertinent to the face and its features. In an embodiment, this could be a "Haar-like features" analysis engine (252) well known in the art of face recognition. The extraction of the acoustic parameters and face feature parameters is performed synchronously using a clock (253). The synchronous acoustic and face feature parameters are passed to the voice biometric, speech recognition and face recognition engines (254, 255, 256) and compared against the user's fused voice biometric, speech recognition and face biometric template, namely the predetermined data sets recorded for that user. The clock (253) in server (250) ensures that the results of the voice biometric, speech recognition and face feature recognition analysis engines (254, 255, 256) are generated synchronously. This allows face recognition features, such as lip movement to be compared with the corresponding acoustic, voice biometric and speech recognition analysis to ascertain whether the face movements correspond with the associated voice.

The stream of results of the voice biometric, speech recognition and face feature recognition analysis generated by the respective engines (2254, 255, 256) of the server (250) are passed to the Business Rules Engine (241) operating on the proxy server (240). The Business Rules Engine (241) computes the authentication and recognition results as a continuous process and is configured to meet the authentication and recognition requirements of the business process set by the service provider website (230).

With reference to FIGS. 1, 2 and 3, an example of a method according to an embodiment of the present invention will now be described in relation to a user accessing an online banking account.

A user (270) securely accesses their online banking website by opening a web browser on a computer (271) for example and navigating to their online banking service (230).

The browser loads the service website which has computer code instructions embedded within (enabled) to launch the method of the present invention. This embedded code (which may be written in HTML5) contacts an application server (220) and database (210) and downloads the appropriate software package version for use in the method to the service website. The version selected is customised to the specific website and business requirements, which in this example comprises a secure banking website and contains the references codes and configurations specific to the authentication process implemented for the specific website.

The embedded code in the website runs on the browser of the user's computer (271) and switches on the camera (not shown) and microphone (not shown) integrated or connected to the user's computer (271). (Where a camera and/or microphone are not available on the user's device (271), this is reported to the proxy server (240), the processes operated by the business rules engine (241) are adjusted and this condition is reported to the secure website (230)). This allows the voice samples and face images of the user to be captured. Advantageously, there is no browser extension, add-on or plug-in required. The camera and microphone are activated by the website code directly and can commence identity verification the moment the user accesses the website with the code embedded. (Technically this can be achieved via the "getUserMedia( )" and associated media communications functions standard in the HTML5 library). There may also be provided on the user's computer/browser a security provision to allow or deny access to the device inputs. The embedded code may contain the internet protocol address of the proxy server (240) where the voice and face samples are sent for analysis. As the method does not use plug-ins, add-ons or extensions the service provider does not need to send the user (270) any additional software in advance to make the process work. The embedded code in the website is only activated when a user accesses that website. Once the process has been completed, the code is not stored on the user's browser or computer (271) and access to the inputs (camera and microphone) ceases.

The captured voice samples and face images are sent as a combined audio/video data stream (typically using WebRTC) to the proxy server (240) along with identity information relating to the user accessing the secure website. Samples are extracted from the audio and video streamed data and passed with the corresponding identity information to the authentication server (250). The authentication server (250) uses the identity information to extract the user's voice and face biometric information from the authentication database (260) and then compares the captured data relating to the voice and face of the user, at a given time, with predetermined data sets associated with the user, and computes the voice and face biometric match scores and speech recognition results using the voice biometric, speech recognition and face recognition analysis engines (254, 255, 256).

The proxy server (240) continuously samples the audio and video data stream from the user's computer (271) and posts the resulting voice samples and face images to the authentication server (250) based on rules implemented by the proxy server (such as required confidence scores). These rules take the result from the previous voice and face biometric matches and speech recognition results, and combines these rules and analysis performed by the authentication server (250) to determine the veracity of the voice and face image samples and the resulting biometric match scores and speech recognition results.

The proxy server (240) uses several rules-based processes as part of the business rules engine (241) to coordinate voice and face information. Eye and lip movement information and face count (the number of faces in the image) information produced by the face biometric technology, is used to authenticate the voice biometric results.

For example, a rule can be set that voice biometric and speech recognition results are only accepted if the face biometric technology detects one and only one face in the image. If no face or more than one face is detected, a warning messages is provided (either visually or verbally using speech synthesis or pre-recorded voice messages).

In another example, eye movement information must indicate that the face is recognised and is looking at the camera on the device for a voice biometrics and speech recognition result to be accepted.

In another example, eye tracking provided by the face biometric is used to detect head movement to infer whether a person is acknowledging a spoken instruction, for example.

In another example, lip detection is used to synchronise lip movement with the phonetic speech recognition result to determine if the lip movement is consistent with phonetic sounds recognised by the speech recognition software. This is an indication of "liveness".

In another example, the visual appearance, may include gait or other movement analysis of the users.

Together, these rules and processing provides a continuous form of authentication and provides continuous security updates to the secure website (230).

The verification result produced by the proxy server (240) is sent to the service website (230) to allow access, deny access or another action such as restricting the types of services that can be accessed, depending on the level of confidence the system has in the biometric match result. As the proxy server (240) is providing continuous identity verification, the access to secure services can be authenticated during an online/real time service.

For example, where no face is detected, sensitive information may be masked and only become visible once a verified face is subsequently detected.

In another example, the continuous verification allows a secure service provider to seamlessly accept card payments, for example in an online shopping application, as the shopper has been continuously verified throughout the online shopping experience. This enables the authentication process to remain in the background and not interfere with the online experience. Given the multi-factor nature of the technology, fusing voice and face biometrics, enables online retailers and other online services to comply with incoming identity authentication and data protection regulations, such as PSD2 and GDPR.

Select embodiments of the invention only have been described and illustrated, and it will be readily apparent that other embodiments, modifications, additions, and omissions are possible within the scope of the invention.

The invention may be varied according to requirements, including but not limited to programming language or emulation, having as its objective the ability to use captured audio and visual data of a user to authenticate and verify an identity during an electronic commerce transaction.

The invention claimed is:

1. A computer-implemented method of authenticating an identity of a user, the method comprising the steps:
    acquiring a first data set representative of a voice of a user over a time interval between a first and second time, and providing the first data set as input to a computing device;
    processing the first data set to extract acoustic parameters pertinent for both voice biometric and speech recognition analysis;
    acquiring a second data set representative of a visual appearance of at least a portion of the user over the time interval between the first and second time, and providing the second data set as input to the computing device;
    processing the second data set to extract user visual feature parameters pertinent for face recognition analysis;
    fusing together of the first and second data sets at the parameter level to maintain a temporal synchronous over the time interval using a clock to ensure that the results of the voice biometric, speech recognition and face feature recognition analysis are generated synchronously;
    comparing the first and second data sets with predetermined data sets relating to the voice and visual appearance of at least a portion of the specific user;
    generating a confidence level in dependence of a relative correspondence of the first and second data sets with the predetermined data sets; and
    authenticating the user as the specific user where the confidence level is above a predetermined value.

2. The method according to claim 1, wherein the method of authenticating is performed over a temporal session period.

3. The method according to claim 2, wherein the steps are repeated during the temporal session period.

4. The method according to claim 1, wherein when the first and second data sets generate a confidence level above the predetermined value, the first and second data sets appended to the predetermined data sets.

5. The method according to claim 1, wherein the method of authenticating is terminated and/or restarted when the generated confidence level is below the predetermined value.

6. The method according to claim 4, wherein the first and second data sets generating a confidence level below the predetermined value are captured separately to the predetermined data sets.

7. The method according to claim 1, wherein the confidence level may comprise a voice confidence level and a visual confidence level.

8. The method according to claim 1, further comprising the step of comparing the first data set with the second data set over the time interval to determine a correspondence between the data sets.

9. The method according to claim 1, further comprising the step of providing instructions to the user relating to the first data set and second data set.

10. The method according to claim 1, wherein face feature recognition is used to determine face feature parameters in the second data set and speech recognition and voice biometric analysis is used to determine speech acoustic parameters in the first data set, the method further comprising comparing the face feature parameters with the speech acoustic parameters at a given time to determine a correspondence therebetween.

11. The method according to claim 1, further comprising the step of providing one or more further biometric data sets of a user, as input to the computing device; and, generating a confidence level in dependence of a relative correspondence of the further data sets with the predetermined data sets.

12. The method according to claim 11, wherein the confidence level may comprise a biometric confidence level.

13. The method according to claim 1, wherein the steps are implemented in HTML5.

14. An electronic commerce transaction process comprising the steps of the method according to claim 1.

15. A telecommunication access process for accessing a telecommunications system, the process comprising the steps of the method according to claim 1.

* * * * *

UNITED STATES PATENT AND TRADEMARK OFFICE
CERTIFICATE OF CORRECTION

PATENT NO. : 12,321,432 B2
APPLICATION NO. : 18/026075
DATED : June 3, 2025
INVENTOR(S) : Clive David Summerfield Page 1 of 1

It is certified that error appears in the above-identified patent and that said Letters Patent is hereby corrected as shown below:

In the Claims

Claim 1, Column 7, Line 60, "together of the" should be --together the--.

Signed and Sealed this
Nineteenth Day of August, 2025

Coke Morgan Stewart
*Acting Director of the United States Patent and Trademark Office*